(12) United States Patent
Kim et al.

(10) Patent No.: US 12,508,667 B2
(45) Date of Patent: Dec. 30, 2025

(54) ELECTRIC VEHICLE BATTERY CASE MANUFACTURING METHOD

(71) Applicant: K.S.M. Co., Ltd., Gimhae-si (KR)

(72) Inventors: Jong Suk Kim, Busan (KR); Byung Chan Kim, Busan (KR)

(73) Assignee: K.S.M. Co., Ltd., Gimhae-si (KR)

( * ) Notice: Subject to any disclaimer, the term of this patent is extended or adjusted under 35 U.S.C. 154(b) by 24 days.

(21) Appl. No.: 18/539,869

(22) Filed: Dec. 14, 2023

(65) Prior Publication Data

US 2025/0100070 A1 Mar. 27, 2025

(30) Foreign Application Priority Data

Sep. 27, 2023 (KR) .......................... 10-2023-0130154

(51) Int. Cl.

| | |
|---|---|
| *B23K 20/00* | (2006.01) |
| *B23K 20/12* | (2006.01) |
| *B23K 26/26* | (2014.01) |
| *H01M 50/119* | (2021.01) |
| *H01M 50/186* | (2021.01) |
| *B23K 101/36* | (2006.01) |

(52) U.S. Cl.
CPC ............ *B23K 20/124* (2013.01); *B23K 26/26* (2013.01); *H01M 50/119* (2021.01); *H01M 50/186* (2021.01); *B23K 2101/36* (2018.08); *H01M 2220/20* (2013.01)

(58) Field of Classification Search
CPC ............... B23K 20/122; B23K 20/129; B23K 20/2336; B23K 2101/045; B23K 2101/006; B23K 2101/18; B23K 2101/24; B23K 2103/10; B23K 26/21; B23K 9/23
See application file for complete search history.

(56) References Cited

U.S. PATENT DOCUMENTS 3,310,914 A * 3/1967 De Klavon ......... E05D 15/0656
49/411
4,857,267 A * 8/1989 Maki ....................... C22C 21/12
419/29

(Continued)

FOREIGN PATENT DOCUMENTS

| JP | 2023-035000 A | 3/2023 |
|---|---|---|
| KR | 10-2432690 A | 8/2022 |

(Continued)

*Primary Examiner* — Erin B Saad
(74) *Attorney, Agent, or Firm* — Sughrue Mion, PLLC

(57) ABSTRACT

An electric vehicle battery case manufacturing method including a first cycle performing operation of sequentially performing a unit assembly preparing step (S1), a first welding step (S2), a first machining step (S3), and a first inspection step (S4), wherein the step (S1) performs a process of preparing unit parts through aluminum extrusion and machining and then welding each sub-assembly, the step (S2) performs a process of assembling the sub-assemblies produced through the step (S1) and then performing metal inert gas (MIG) welding or friction stir welding (FSW), the step (S3) performs a process of performing machining or hole machining on a welding bead part and a distorted surface of a product assembled through the step (S2), and the step (S4) performs a process of conducting a leak test on the product corrected through the step (S3).

5 Claims, 24 Drawing Sheets

(56) References Cited

U.S. PATENT DOCUMENTS

| | | | | |
|---|---|---|---|---|
| 4,877,227 A * | 10/1989 | Sassella | B25B 1/08 |
| | | | 269/236 |
| 5,577,951 A * | 11/1996 | Jabcon, Jr. | E06B 3/267 |
| | | | 451/182 |
| 6,422,449 B1 * | 7/2002 | Ezumi | B23K 20/1265 |
| | | | 29/402.06 |
| 11,817,602 B2 * | 11/2023 | Kim | H01M 50/505 |
| 11,936,058 B2 * | 3/2024 | Sekar | H01M 50/242 |
| 11,996,576 B2 * | 5/2024 | Foran | H01M 10/625 |
| 2006/0065518 A1 * | 3/2006 | Aiura | B23H 5/08 |
| | | | 204/198 |
| 2011/0194974 A1 | 8/2011 | Wakaguri | B32B 15/016 |
| | | | 420/541 |
| 2019/0334144 A1 * | 10/2019 | Kim | B23K 9/0035 |
| 2020/0152929 A1 * | 5/2020 | Collins | H01M 50/204 |
| 2020/0365955 A1 * | 11/2020 | Kim | H01M 10/613 |
| 2021/0098758 A1 * | 4/2021 | Kim | H01M 10/6561 |
| 2022/0006150 A1 * | 1/2022 | Foran | H01M 50/227 |
| 2022/0344752 A1 * | 10/2022 | Ishitobi | H01M 50/121 |
| 2023/0023909 A1 * | 1/2023 | He | H01M 50/209 |
| 2023/0073258 A1 * | 3/2023 | Mogi | H01M 10/647 |
| 2023/0117003 A1 * | 4/2023 | Spangler | H01M 50/204 |
| | | | 429/99 |
| 2023/0137848 A1 * | 5/2023 | Naruke | H01M 50/264 |
| | | | 180/68.5 |
| 2023/0231223 A1 * | 7/2023 | Tan | H01M 10/625 |
| | | | 429/120 |
| 2023/0246278 A1 * | 8/2023 | Yoshida | H01M 50/204 |
| | | | 429/7 |
| 2023/0271504 A1 * | 8/2023 | Wan | H01M 50/242 |
| | | | 701/22 |
| 2023/0275304 A1 * | 8/2023 | Mogi | H01M 50/204 |
| 2023/0335846 A1 * | 10/2023 | Jeon | H01M 10/625 |
| 2023/0335848 A1 * | 10/2023 | Seok | B60L 3/0007 |
| 2024/0194997 A1 * | 6/2024 | Oh | H01M 50/209 |

FOREIGN PATENT DOCUMENTS

| | | | | |
|---|---|---|---|---|
| KR | 10-2023-0094031 A | 6/2023 | | |
| KR | 10-2023-0132130 A | 9/2023 | | |
| WO | WO-2021070533 A1 * | 4/2021 | | B29C 70/18 |

* cited by examiner

FIG. 16
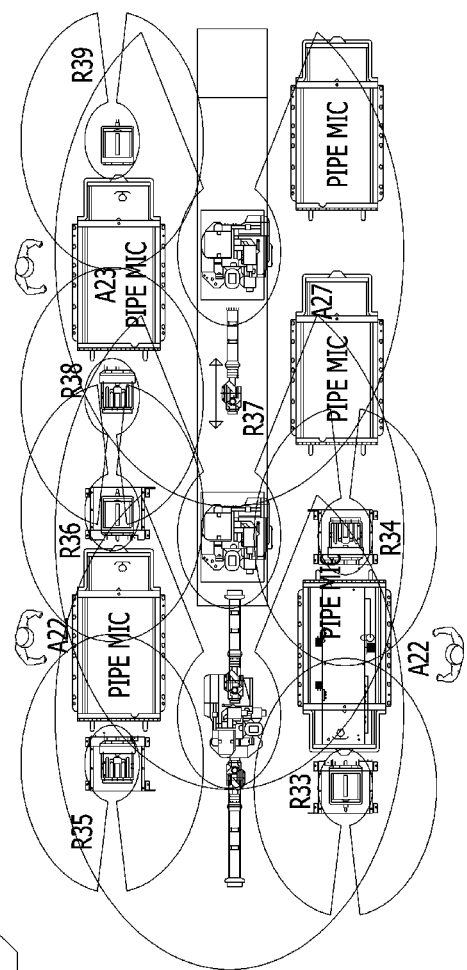
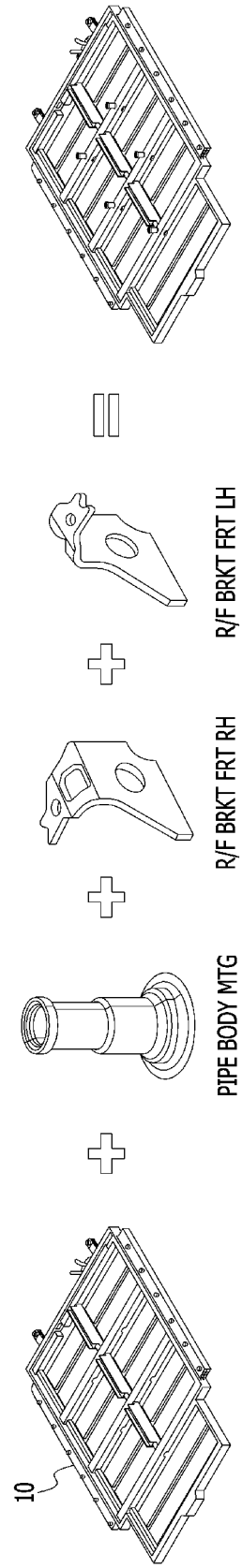

ELECTRIC VEHICLE BATTERY CASE MANUFACTURING METHOD

CROSS-REFERENCE TO RELATED APPLICATION

This application claims priority to and the benefit of Korean Patent Application No. 10-2023-0130154, filed on Sep. 27, 2023, the disclosure of which is incorporated herein by reference in its entirety.

BACKGROUND

1. Field of the Invention

The present disclosure relates to an electric vehicle battery case manufacturing method, and more particularly, to an electric vehicle battery case manufacturing method that can prevent welding distortion that occurs during welding of a hole and a machined profile.

2. Discussion of Related Art

In the case of an electric vehicle battery case according to the related art, surface machining and hole machining are performed for each part of an extruded profile, and then the parts are jointed through metal inert gas (MIG) welding, friction stir welding (FSW), and the like to complete a single electric vehicle battery case.

Specifically, since surface machining and hole machining of sub-parts are performed first, the designed dimensional tolerance is often not satisfied due to welding distortion that occurs in final welding which is performed afterwards. In order to address defects due to welding distortion, a distortion correcting process is added as a post-welding process.

As a result, an electric vehicle battery case manufacturing method according to the related art has problems such as an increase in man-hour, an increase in manufacturing time, and an increase in manufacturing costs due to the correcting process for welding distortion.

As a specific example, in the case of an electric vehicle battery case using an aluminum material, distortion occurs due to heat during welding of a hole and a machined profile. The distortion causes deviation from an acceptable tolerance of the machined hole and a problem in terms of smoothness and affects assembly of a battery system assembly (final product), assembly of lower and upper panels, and the overall product quality. In addition, the distortion affects automation of a riveting task for about 300 holes in the production of the battery case and causes a problem also in terms of production efficiency.

Therefore, there is a need for technology that can address the problems of the related art.

RELATED ART DOCUMENT

Patent Document (Patent Document 1) Korean Patent Registration No. 10-2432690 (Date of Registration: Aug. 10, 2022)

SUMMARY OF THE INVENTION

The present disclosure is directed to providing an electric vehicle battery case manufacturing method that can stabilize the smoothness of parts in an electric vehicle battery case manufacturing process, stabilize the hole machining tolerance, prevent defects and production loss that may occur during the electric vehicle battery case manufacturing process, and automate a riveting process which is a subsequent process, thereby reducing production costs as well as costs for discarding defective products, and ensuring high quality of the final product.

One aspect of the present disclosure provides an electric vehicle battery case manufacturing method including a first cycle performing operation of sequentially performing a unit assembly preparing step (S1), a first welding step (S2), a first machining step (S3), and a first inspection step (S4), wherein the unit assembly preparing step (S1) performs a process of preparing unit parts through aluminum extrusion and machining and then welding each sub-assembly, the first welding step (S2) performs a process of assembling the sub-assemblies produced through the unit assembly preparing step (S1) and then performing metal inert gas (MIG) welding or friction stir welding (FSW), the first machining step (S3) performs a process of performing machining or hole machining on a welding bead part and a distorted surface of a product assembled through the first welding step (S2), and the first inspection step (S4) performs a process of conducting a leak test on the product corrected through the first machining step (S3).

In one embodiment of the present disclosure, the electric vehicle battery case manufacturing method may include a second cycle performing operation of sequentially performing a second welding step (S5), a second machining step (S10), a third welding step (S11), and a second inspection step (S12) that is performed after the first cycle performing operation, wherein the second welding step (S5) may perform a process of performing FSW and laser welding on the product that has passed through the first inspection step (S4), the second machining step (S10) may perform a process of performing final surface machining on the welding bead part and the distorted surface of the product assembled through the second welding step (S5) and then performing final hole machining at a designed position, the third welding step (S11) may perform a process of performing pipe MIG welding on the product produced through the second machining step (S10), and the second inspection step (S12) may perform a process of conducting a leak test on the product completed through the third welding step (S11).

In one embodiment of the present disclosure, the electric vehicle battery case manufacturing method may further include: a product fastening step (S13) including rivet-fastening and screw-fastening the product that has passed through the second inspection step (S12) to assemble the product; a final inspection step (S14) including performing an inspection of the product completed through the product fastening step (S13); and a complete product releasing step (S15) including packaging and releasing the product that has passed through the final inspection step (S14).

In one embodiment of the present disclosure, the first welding step may include producing a single edge frame structure by using a MIG welding method or a FSW method on left and right member body side sub-assemblies, a rear member body sub-assembly, and a bracket module mounting sub-assembly.

In this case, the first machining step may include: an upper welding bead machining step including machining an upper welding bead of the edge frame structure produced through the first welding step; a lower welding bead machining step including machining a lower welding bead of the edge frame structure after the upper welding bead machining step is performed; and an air blowing step including performing a cleaning task on a machined surface using compressed air after the lower welding bead machining step is performed.

In one embodiment of the present disclosure, the second welding step (S5) may include: a bracket welding step (S5-1) including assembling a plurality of bracket module mounting sub-assemblies and a plurality of bracket swelling blocking sub-assemblies to the edge frame structure using the MIG welding method; a lower sealing plate welding step (S6) including assembling a lower sealing plate to a lower surface of the edge frame structure produced through the bracket welding step (S5-1) using a laser welding method; a lower sealing plate assembly state inspection step (S7) including performing an inspection of an assembly state of the edge frame structure produced through the lower sealing plate welding step (S6); a FSW step (S8) including performing final welding of a MIG welding site and a laser welding site on the edge frame structure, which has passed through the inspection step (S7), using the FSW method; and a FSW part finishing and inspection step (S9) including finishing a FSW part and then performing an inspection of a finished surface after the FSW step (S8) is performed.

In one embodiment of the present disclosure, the complete product releasing step (S15) may include: a lower surface cover member preparing step (S15-1) including producing a lower surface cover member having a structure that is able to seal an upper surface of the edge frame structure; a lower surface cover member fixing step (S16) including mounting the lower surface cover member on the upper surface of the edge frame structure and then fastening the lower surface cover member using a flow drilling screw (FDS); an air blowing and Z-surface inspection step (S17) including performing a cleaning task of the product that has passed through the lower surface cover member fixing step (S16) by using compressed air and then performing an inspection of an upper surface and a lower surface of the product; and a vision inspection and laser marking step (S18) including performing, through a vision inspection, a final inspection of the product that has passed through the air blowing and Z-surface inspection step (S17) and then performing marking using a laser.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 16 is a schematic process diagram showing a third welding step (S11) of the electric vehicle battery case manufacturing method according to one embodiment of the present disclosure;

DETAILED DESCRIPTION OF EXEMPLARY EMBODIMENTS

Hereinafter, exemplary embodiments of the present disclosure will be described in detail with reference to the accompanying drawings. Terms or words used in the present specification and claims should not be construed as being limited to their general or dictionary meanings and should be construed as having meanings and concepts that are in accordance with the technical spirit of the present disclosure.

Throughout the specification, when a certain member is described as being positioned "on" another member, this not only includes a case in which the certain member is in contact with the other member but also includes a case in which another member is present between the two members. Throughout the specification, when a certain portion is described as "including" a certain component, it means that the certain portion may further include another component instead of excluding other components unless clearly indicated otherwise.

Figure 1:
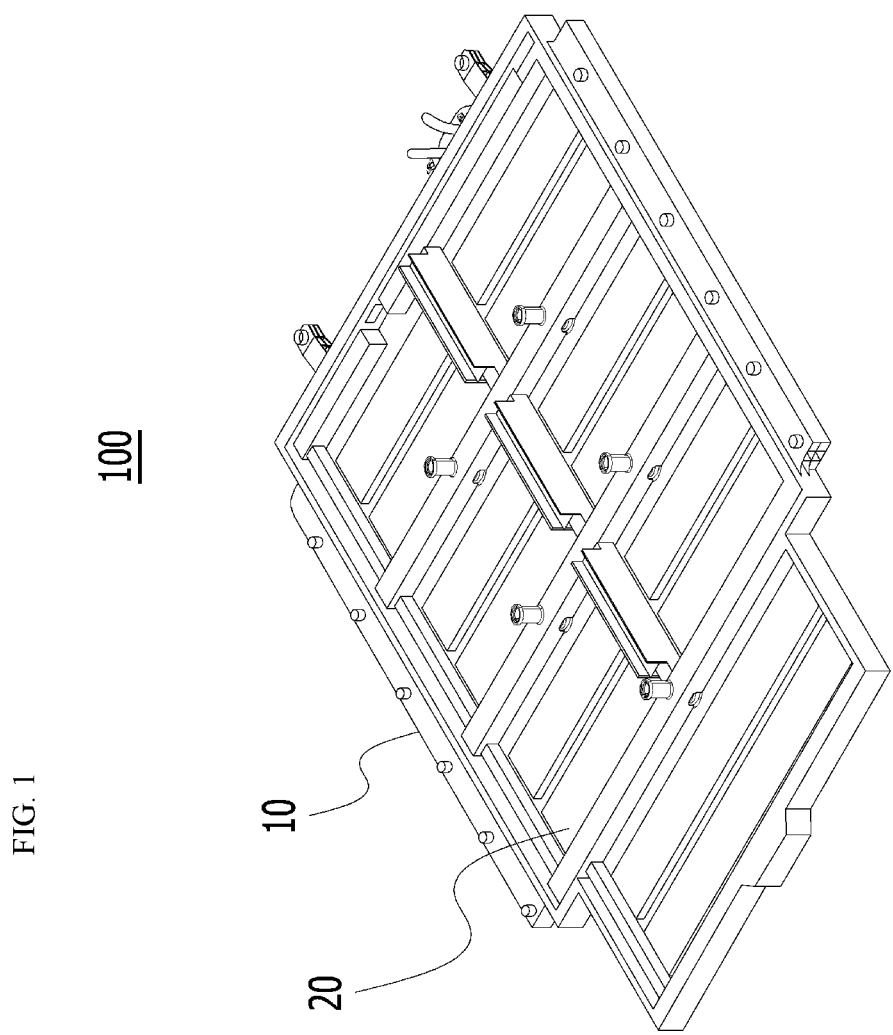
FIG. 1 is a perspective view showing a product produced by an electric vehicle battery case manufacturing method according to one embodiment of the present disclosure.
Figure 2A:
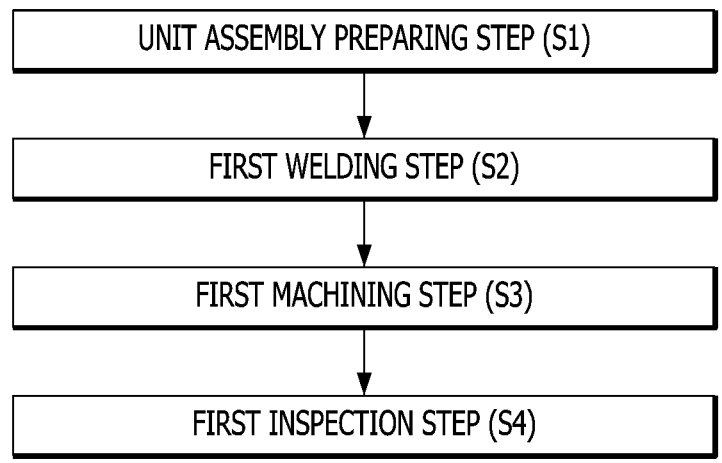
FIG. 2A is a flowchart showing the electric vehicle battery case manufacturing method according to an embodiment of the present disclosure.
Figure 2B:
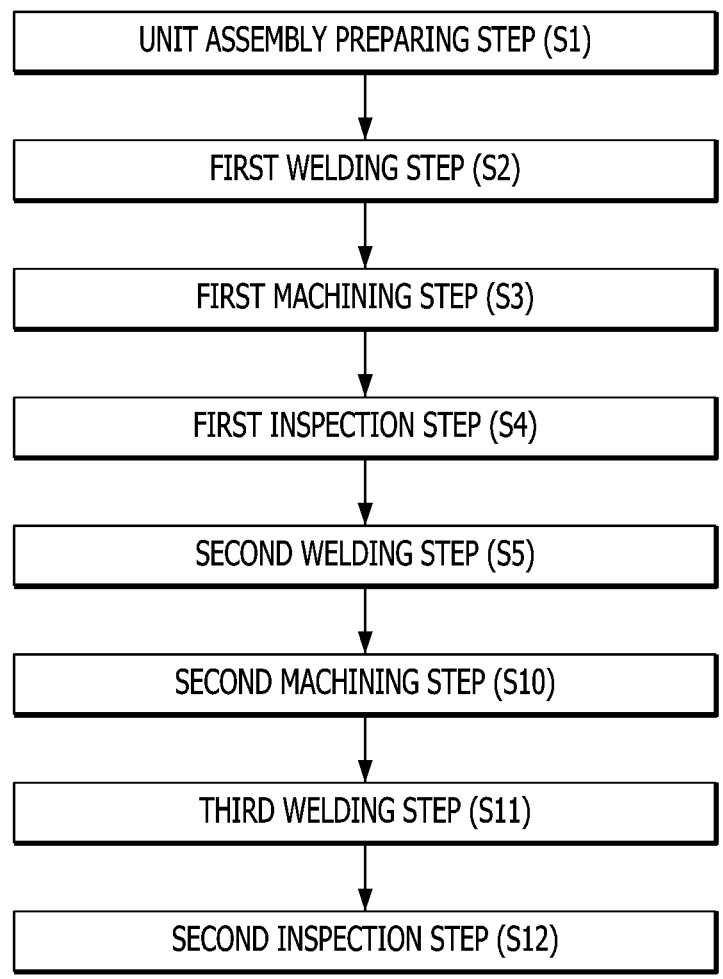
FIG. 2B is a flowchart showing the electric vehicle battery case manufacturing method according to another embodiment of the present disclosure.

FIG. 1 illustrates a perspective view showing a product produced by an electric vehicle battery case manufacturing method according to one embodiment of the present disclosure, and FIGS. 2A and 2B illustrate flowcharts showing the electric vehicle battery case manufacturing method according to embodiments of the present disclosure.

Referring to FIGS. 1, 2A, and 2B, in an electric vehicle battery case manufacturing method (S100) according to the present embodiment, a unit assembly preparing step (S1), a first welding step (S2), a first machining step (S3), a first inspection step (S4), a second welding step (S5), a second machining step (S10), a third welding step (S11), and a second inspection step (S12), each of which performs a specific process, are sequentially performed, and surface machining and hole machining are performed after welding in which welding distortion occurs is performed first, and thus welding distortion, dimensional defects in surface machining, and dimensional defects in hole machining according to the related art can be fundamentally prevented, and the man-hour for correcting dimensional defects in surface machining and dimensional defects in hole machining can be eliminated. As a result, not only is it possible to reduce manufacturing costs while securing the efficiency of the production process, but also high quality of the final product can be ensured.

Hereinafter, each step constituting the electric vehicle battery case manufacturing method (S100) according to the present embodiment will be described in detail with reference to the drawings.

Figure 3:
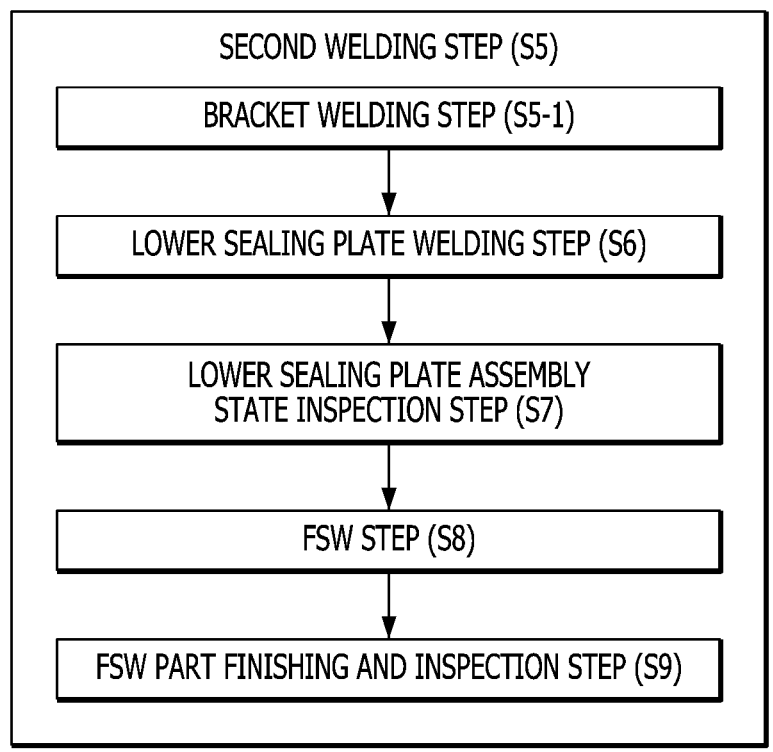
FIG. 3 is a flowchart showing a second welding step of the electric vehicle battery case manufacturing method illustrated in FIG. 2B in more detail.
Figure 4:
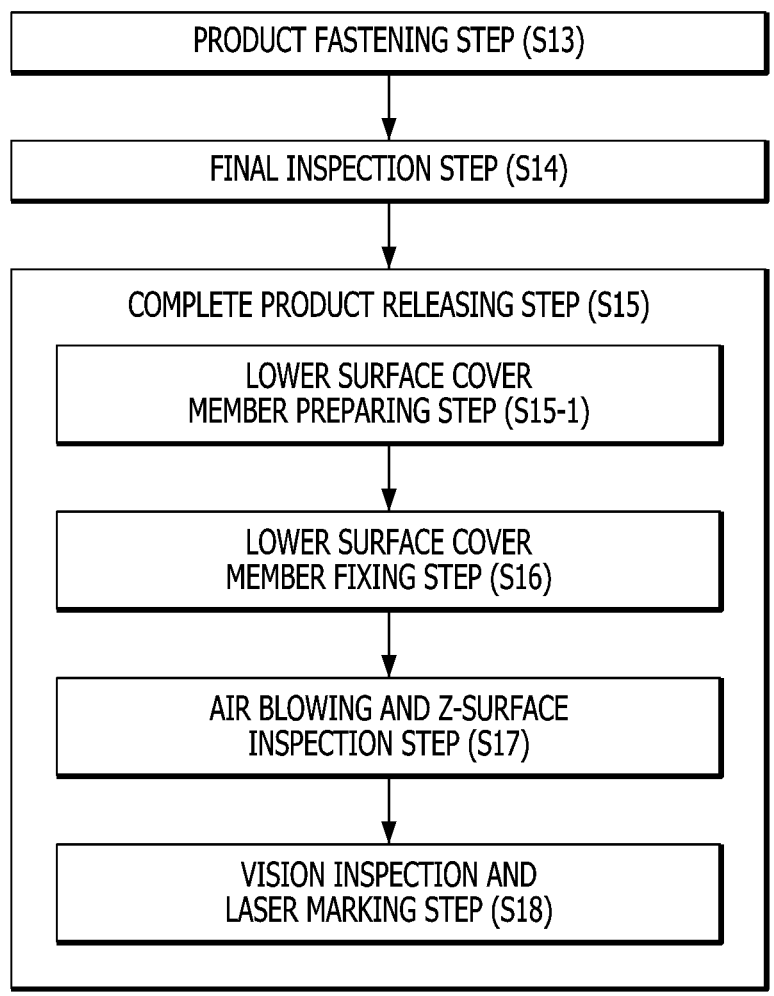
FIG. 4 is a flowchart showing a product fastening step, a final inspection step, and a complete product releasing step of the electric vehicle battery case manufacturing method according to one embodiment of the present disclosure.
Figure 5:
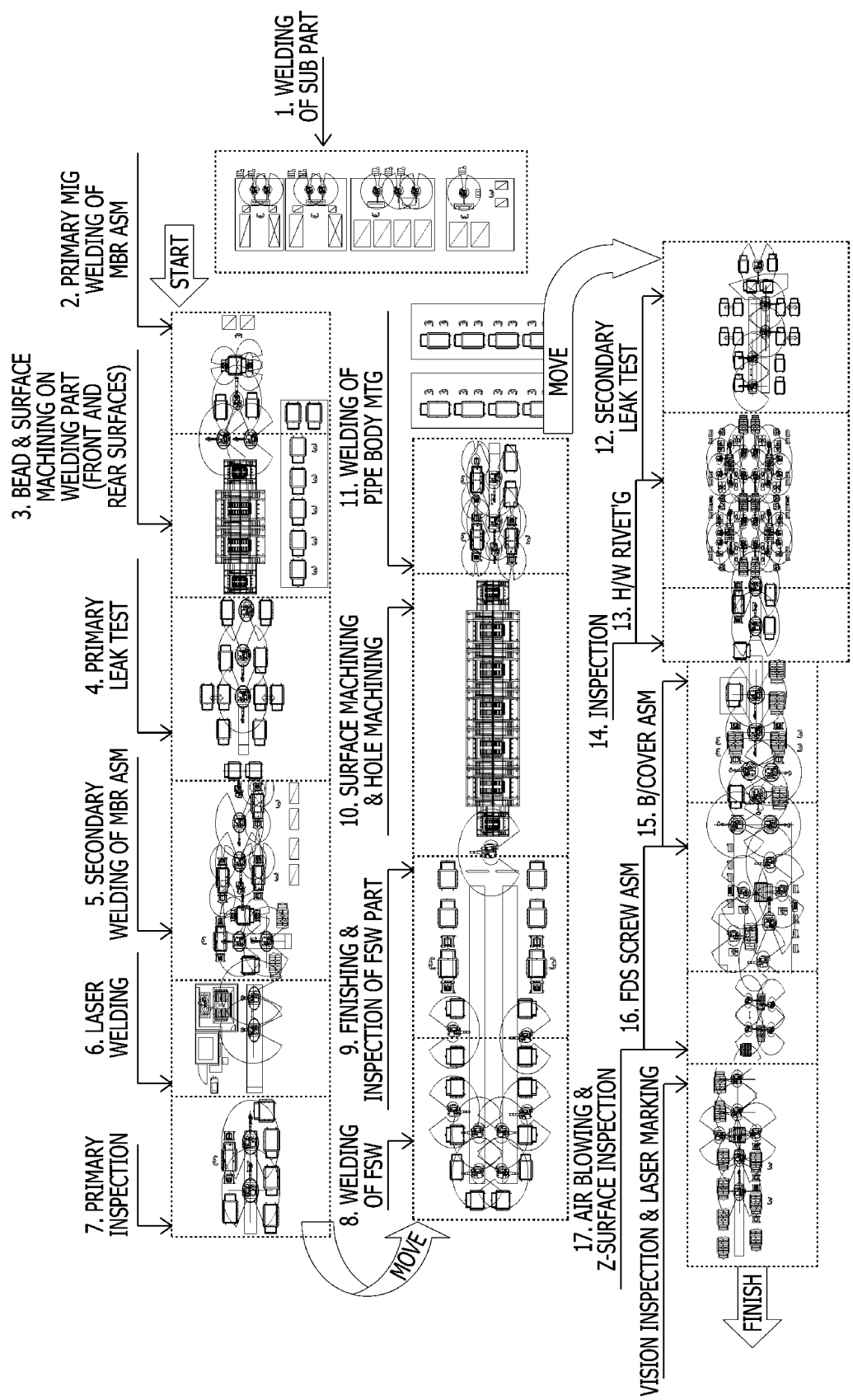
FIG. 5 is a schematic process diagram showing the electric vehicle battery case manufacturing method according to one embodiment of the present disclosure.
Figure 6:
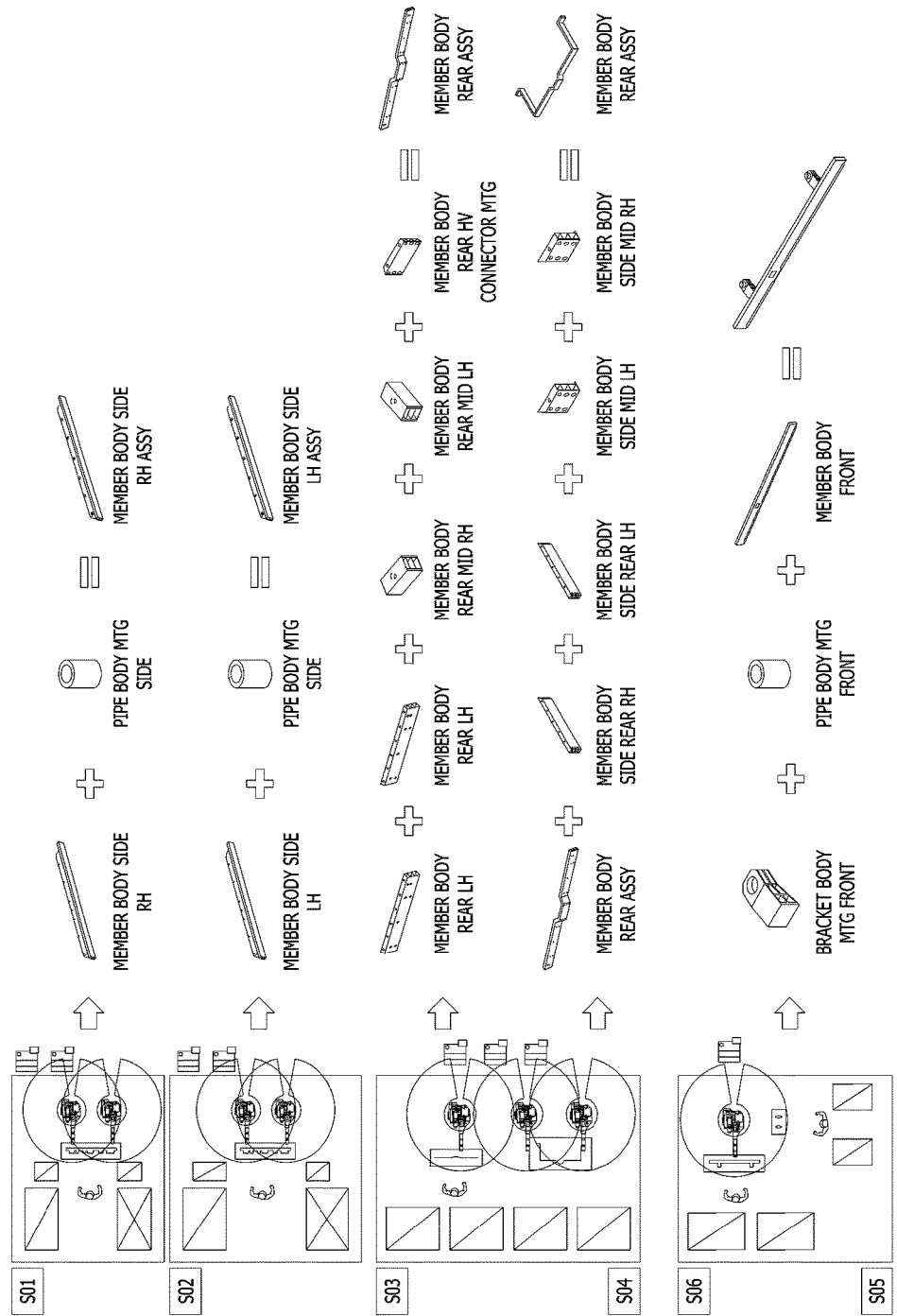
FIG. 6 is a schematic process diagram showing a unit assembly preparing step (S1) of the electric vehicle battery case manufacturing method according to one embodiment of the present disclosure.

FIG. 3 illustrates a flowchart showing a second welding step of the electric vehicle battery case manufacturing method illustrated in FIG. 2B in more detail, FIG. 4 illustrates a flowchart showing a product fastening step, a final inspection step, and a complete product releasing step of the electric vehicle battery case manufacturing method according to one embodiment of the present disclosure, and FIG. 5 illustrates a schematic process diagram showing the electric vehicle battery case manufacturing method according to one embodiment of the present disclosure.

Referring to FIGS. 3 to 5, the unit assembly preparing step (S1) according to the present embodiment performs a process of preparing unit parts through aluminum extrusion and machining and then welding each sub-assembly.

The first welding step (S2) according to the present embodiment performs a process of assembling the sub-assemblies produced through the unit assembly preparing step (S1) and then performing metal inert gas (MIG) welding or friction stir welding (FSW).

The first machining step (S3) according to the present embodiment performs a process of performing machining on a welding bead part and a distorted surface of a product assembled through the first welding step (S2) to correct the welding bead part and the distorted surface of the product.

The first inspection step (S4) according to the present embodiment includes conducting a leak test on the product corrected through the first machining step (S3).

The second welding step (S5) according to the present embodiment includes performing FSW and laser welding on the product that has passed through the first inspection step (S4).

The second machining step (S10) according to the present embodiment includes performing final surface machining on the welding bead part and the distorted surface of the product assembled through the second welding step (S5) and then performing final hole machining at a designed position.

The third welding step (S11) according to the present embodiment includes performing pipe MIG welding on the product produced through the second machining step (S10).

The second inspection step (S12) according to the present embodiment includes conducting a leak test on the product completed through the third welding step (S11).

As illustrated in FIGS. 4 and 5, the electric vehicle battery case manufacturing method (S100) according to the present embodiment may further include a product fastening step (S13), a final inspection step (S14), and a complete product releasing step (S15), each of which performs a specific process.

Specifically, the product fastening step (S13) according to the present embodiment performs a process of rivet-fastening and screw-fastening the product that has passed through the second inspection step (S12) to assemble the product.

The final inspection step (S14) according to the present embodiment performs a process of performing an inspection of the product completed through the product fastening step (S13).

Also, the complete product releasing step (S15) performs a process of packaging and releasing the product that has passed through the final inspection step (S14).

FIGS. 6 to 23 illustrate a schematic process diagram showing each step of the electric vehicle battery case manufacturing method (S100).

Hereinafter, each process will be described in detail with reference to each schematic process diagram.

Figure 7:
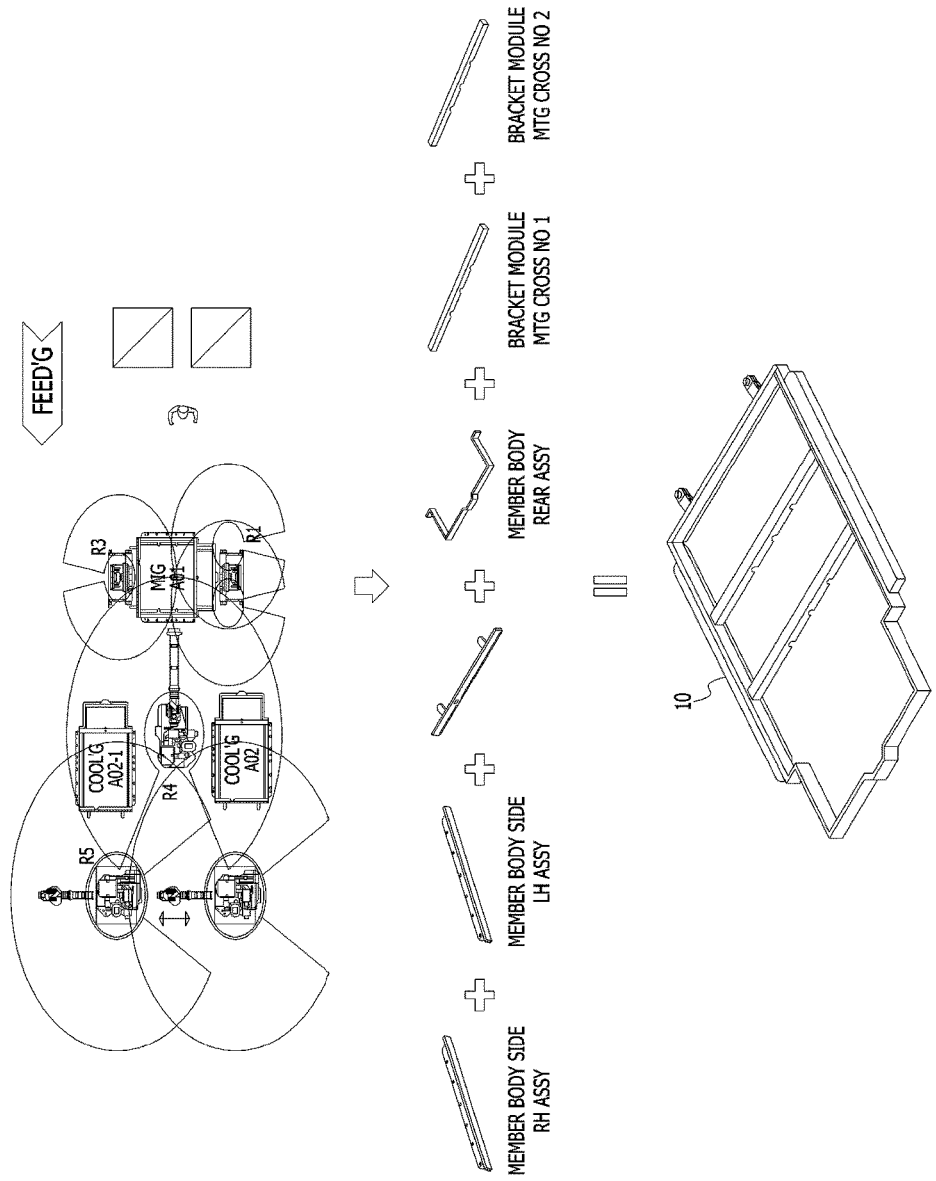
FIG. 7 is a schematic process diagram showing a first welding step (S2) of the electric vehicle battery case manufacturing method according to one embodiment of the present disclosure.

As illustrated in FIGS. 2B, 5, and 7, the first welding step (S2) according to the present embodiment performs a process of producing a single edge frame structure 10 by using a MIG welding method on left and right member body side sub-assemblies, a rear member body sub-assembly, and a bracket module mounting sub-assembly.

Figure 8:
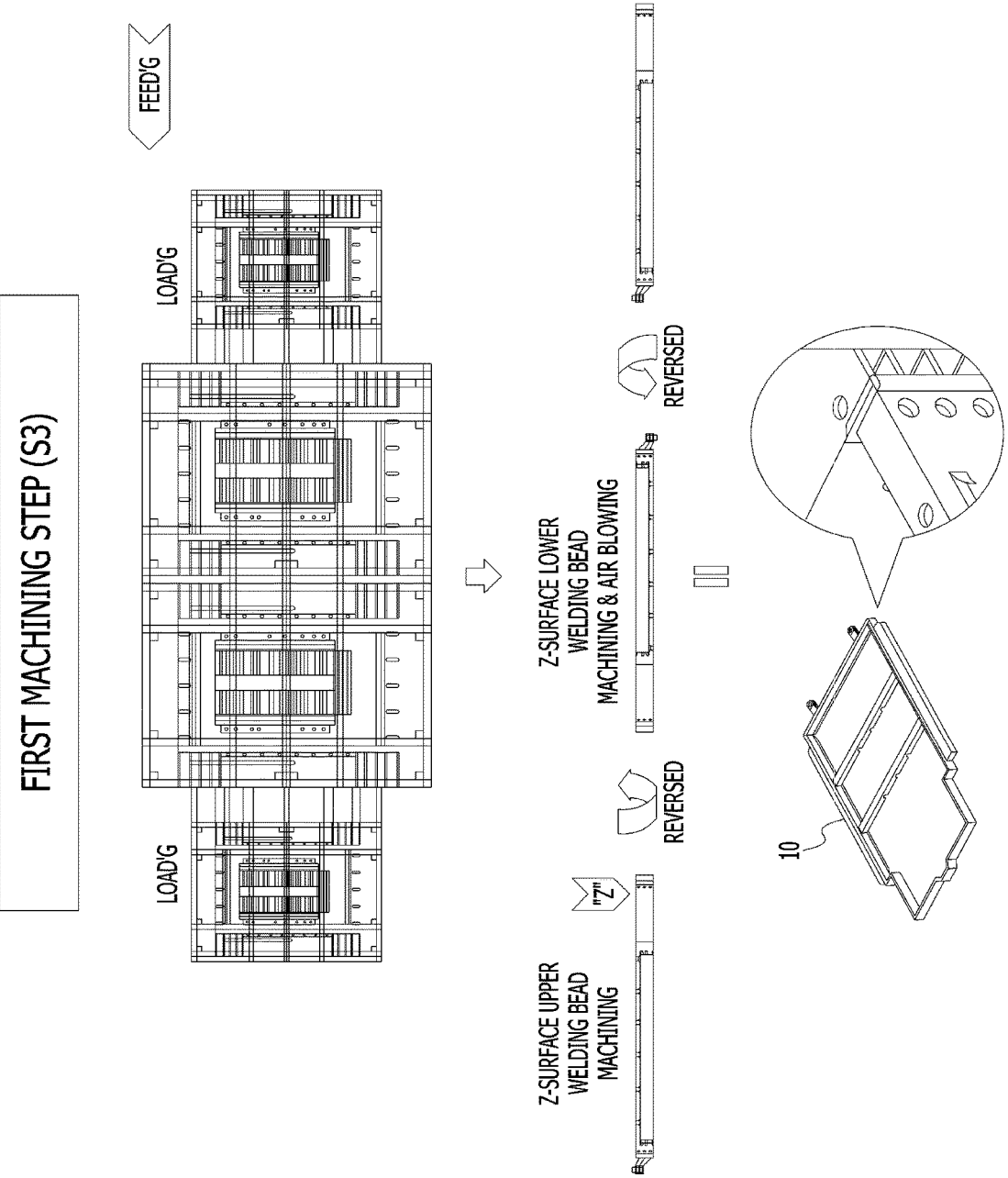
FIG. 8 is a schematic process diagram showing a first machining step (S3) of the electric vehicle battery case manufacturing method according to one embodiment of the present disclosure.
Figure 9:
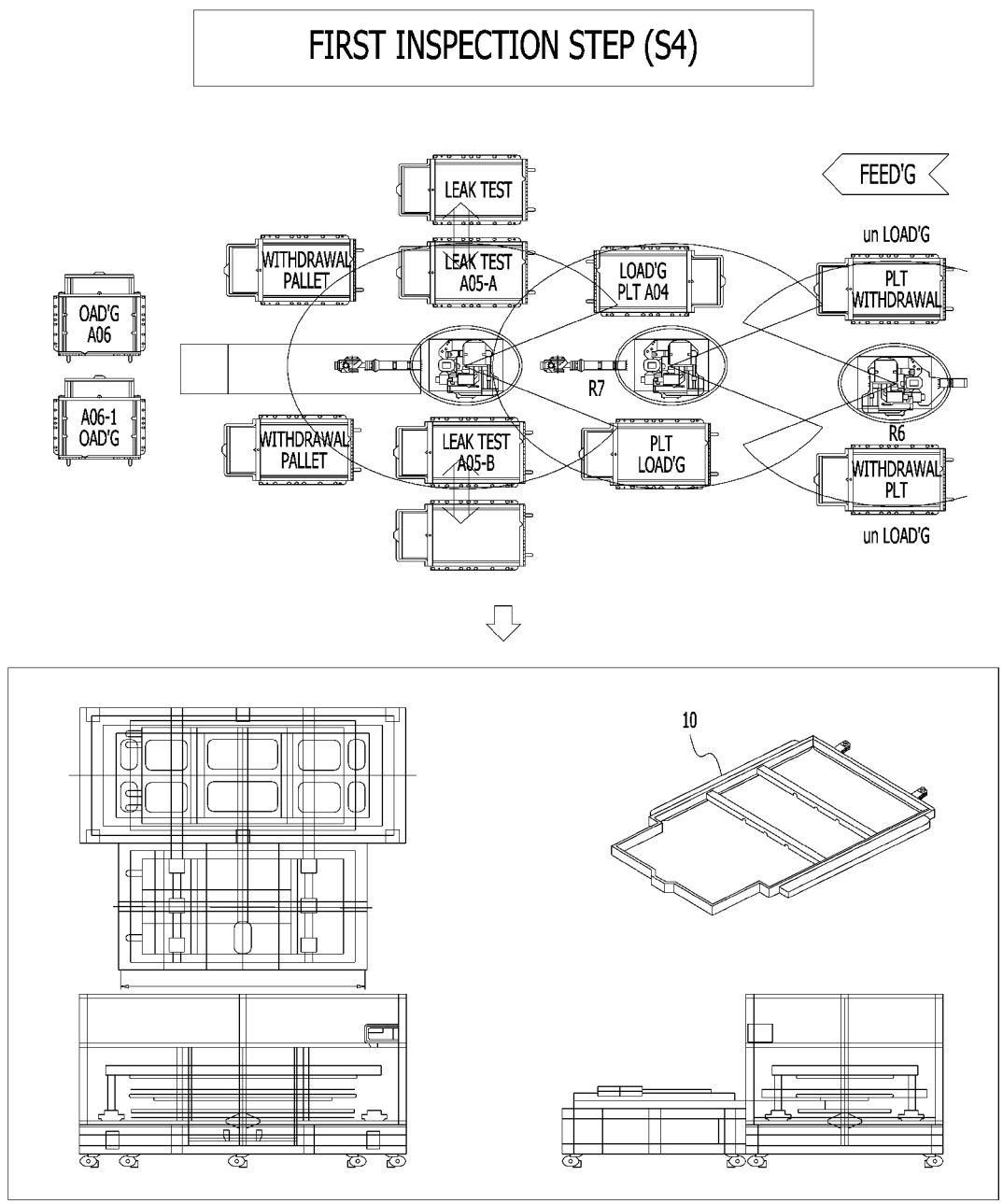
FIG. 9 is a schematic process diagram showing a first inspection step (S4) of the electric vehicle battery case manufacturing method according to one embodiment of the present disclosure.
Figure 10:
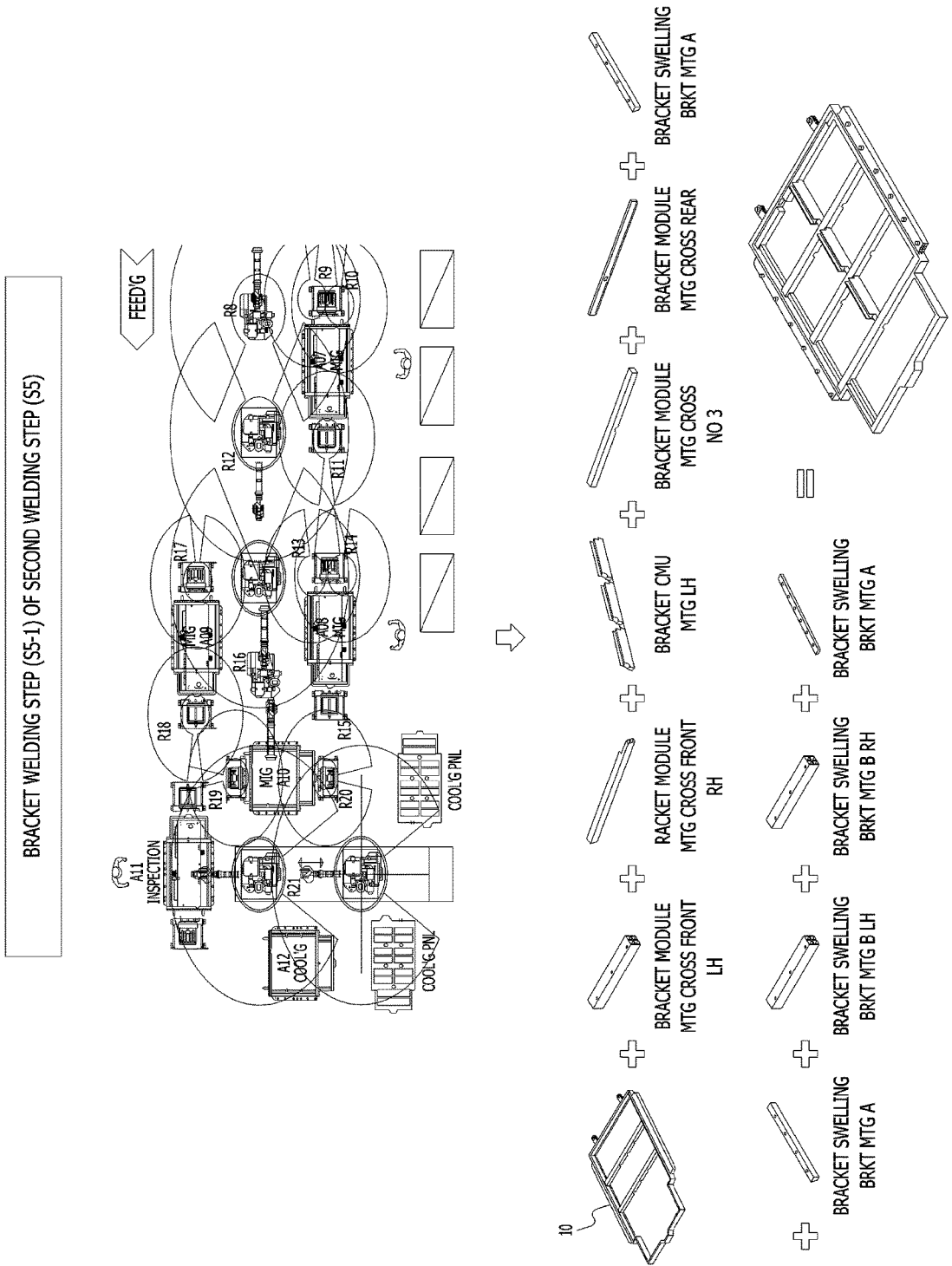
FIG. 10 is a schematic process diagram showing a bracket welding step (S5-1) included in a second welding step (S5) of the electric vehicle battery case manufacturing method according to one embodiment of the present disclosure.
Figure 11:
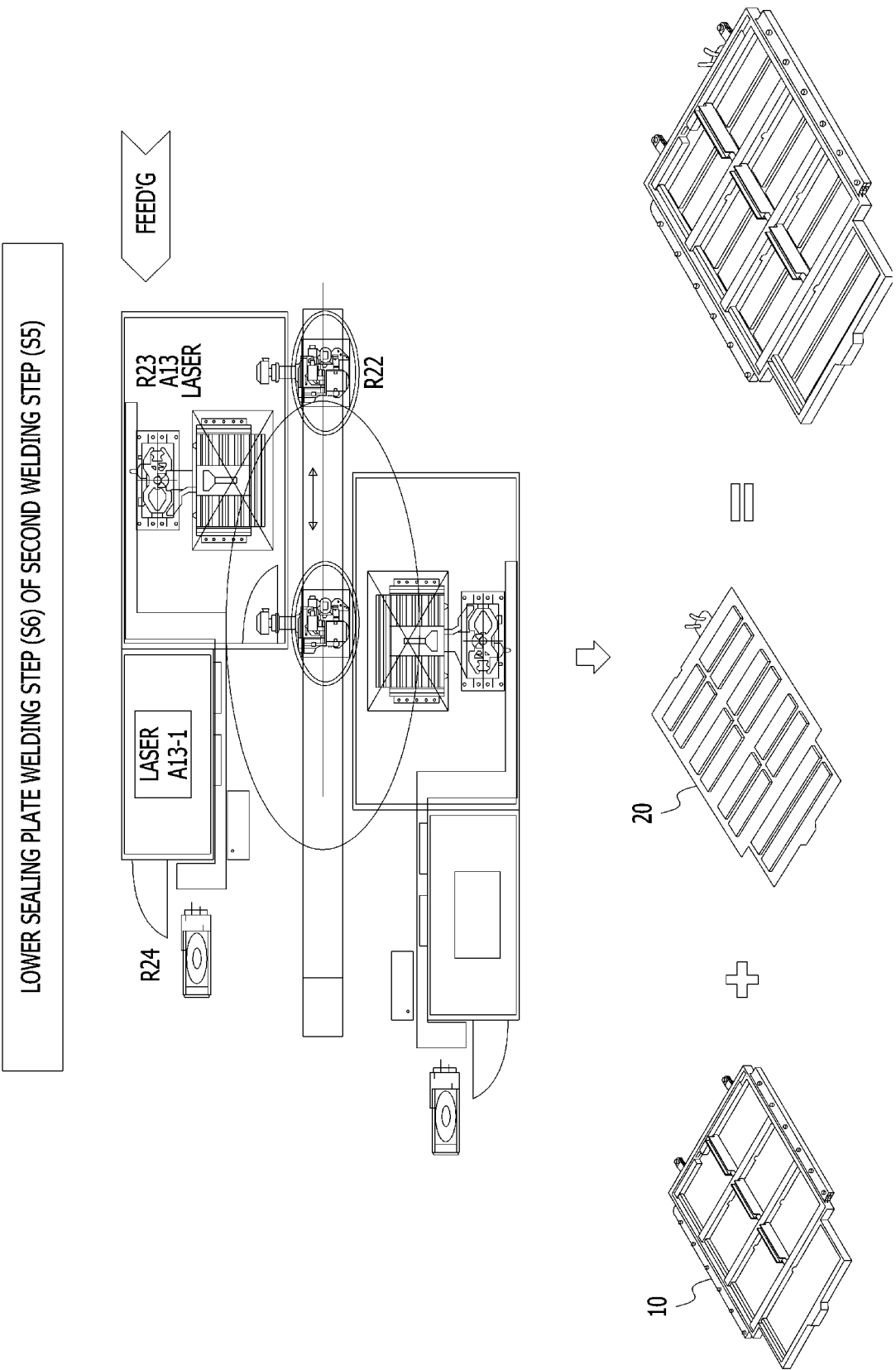
FIG. 11 is a schematic process diagram showing a lower sealing plate welding step (S6) included in the second welding step (S5) of the electric vehicle battery case manufacturing method according to one embodiment of the present disclosure.
Figure 12:
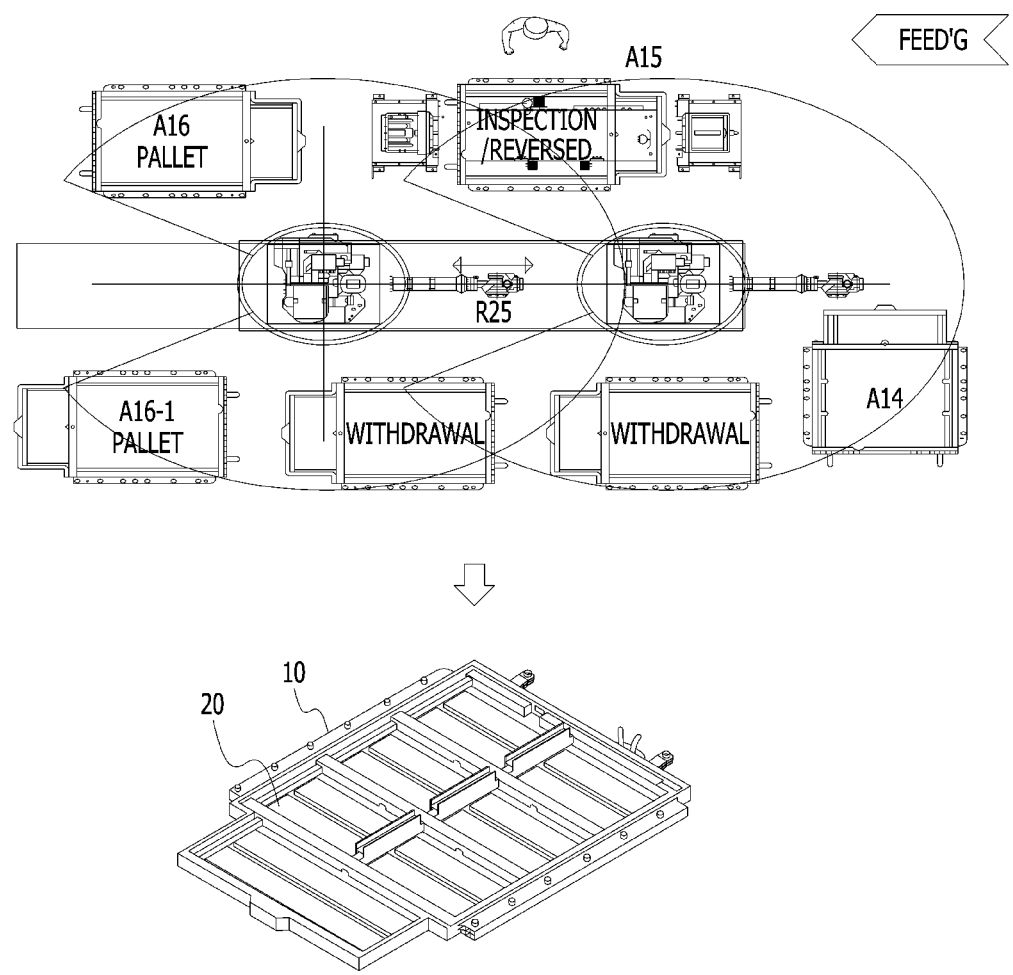
FIG. 12 is a schematic process diagram showing a lower sealing plate assembly state inspection step (S7) included in the second welding step (S5) of the electric vehicle battery case manufacturing method according to one embodiment of the present disclosure.
Figure 13:
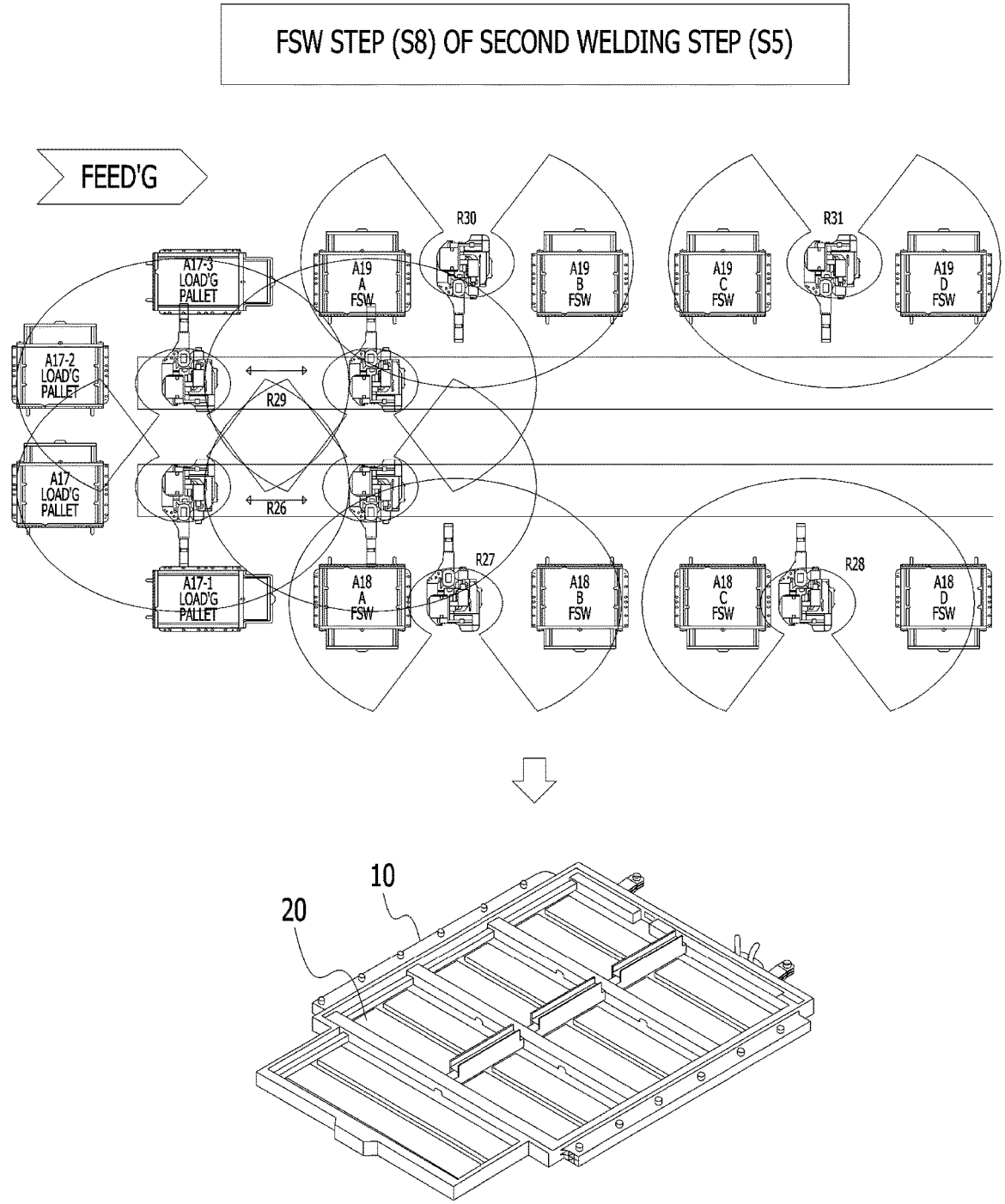
FIG. 13 is a schematic process diagram showing a FSW step (S8) included in the second welding step (S5) of the electric vehicle battery case manufacturing method according to one embodiment of the present disclosure.
Figure 14:
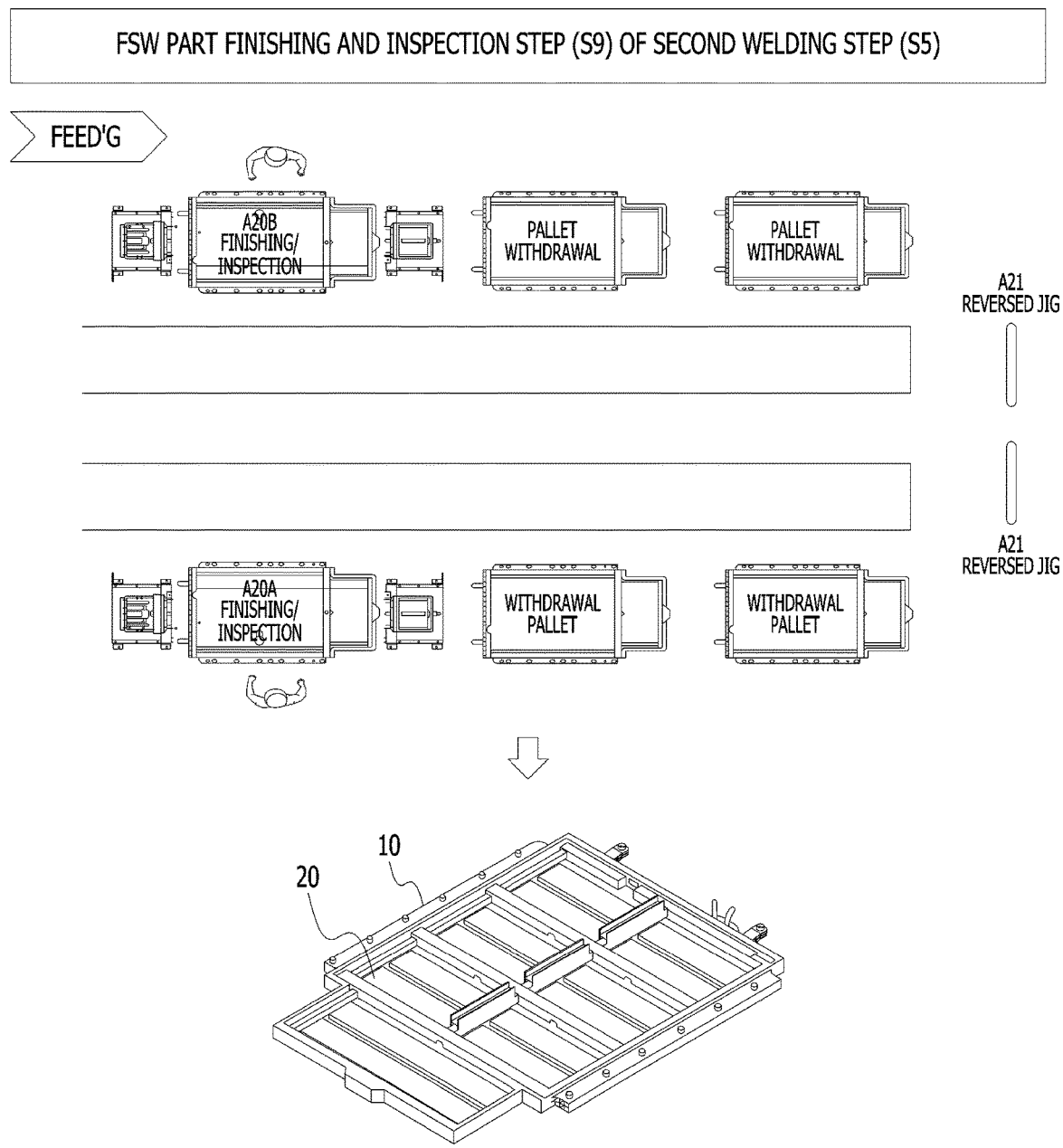
FIG. 14 is a schematic process diagram showing a FSW part finishing and inspection step (S9) included in the second welding step (S5) of the electric vehicle battery case manufacturing method according to one embodiment of the present disclosure.
Figure 15:
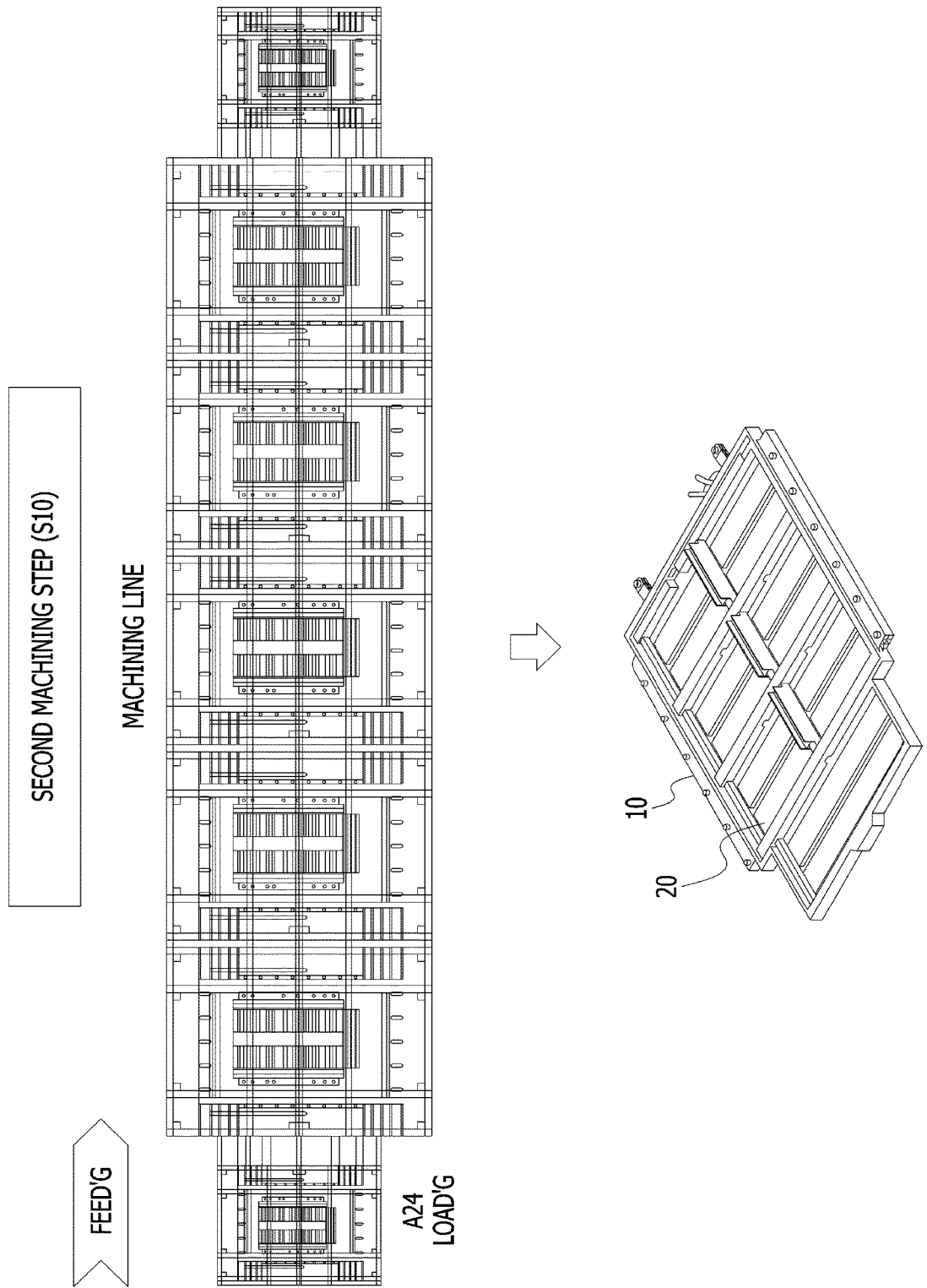
FIG. 15 is a schematic process diagram showing a second machining step (S10) of the electric vehicle battery case manufacturing method according to one embodiment of the present disclosure.
Figure 17:
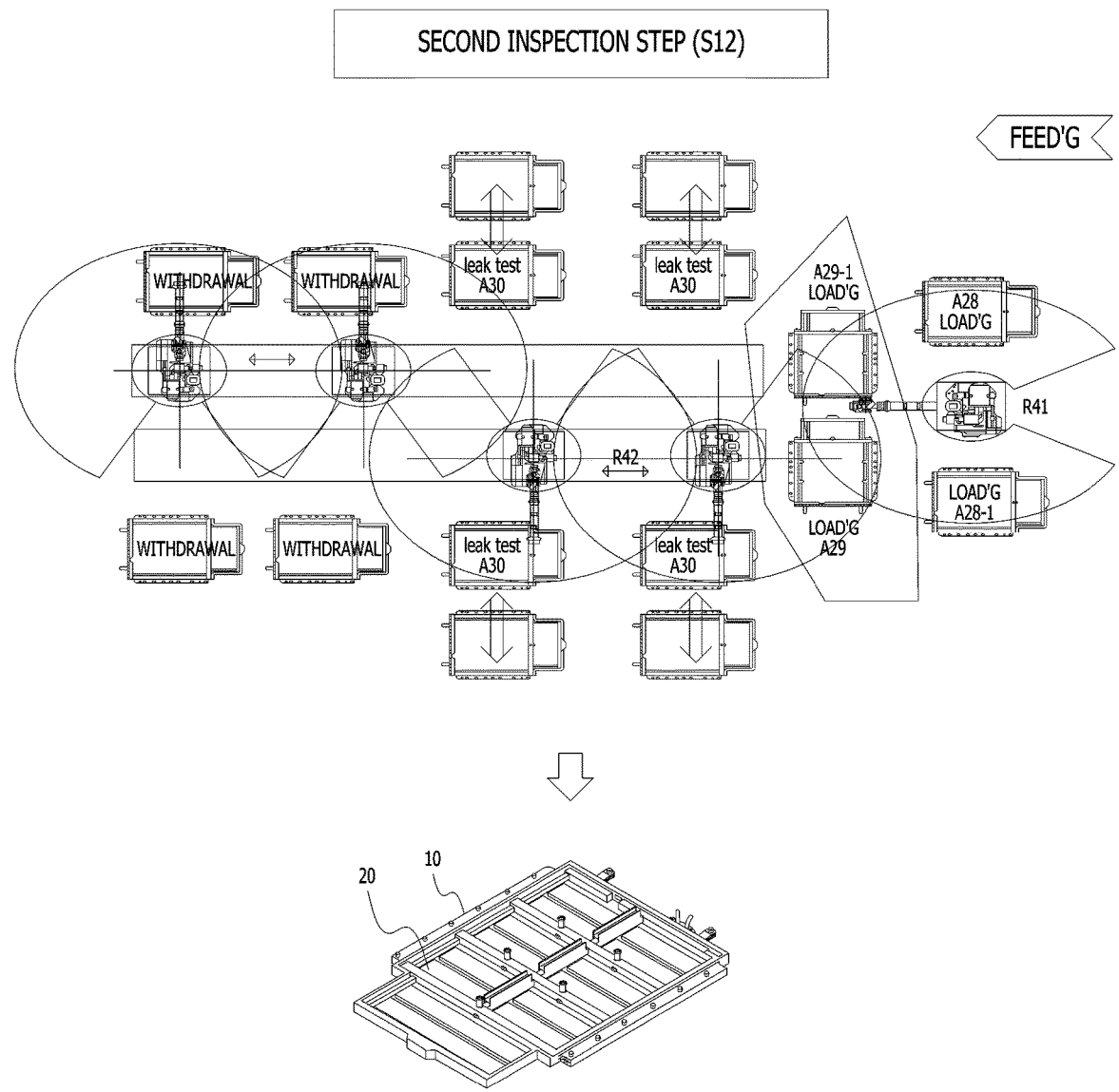
FIG. 17 is a schematic process diagram showing a second inspection step (S12) of the electric vehicle battery case manufacturing method according to one embodiment of the present disclosure.
Figure 18:
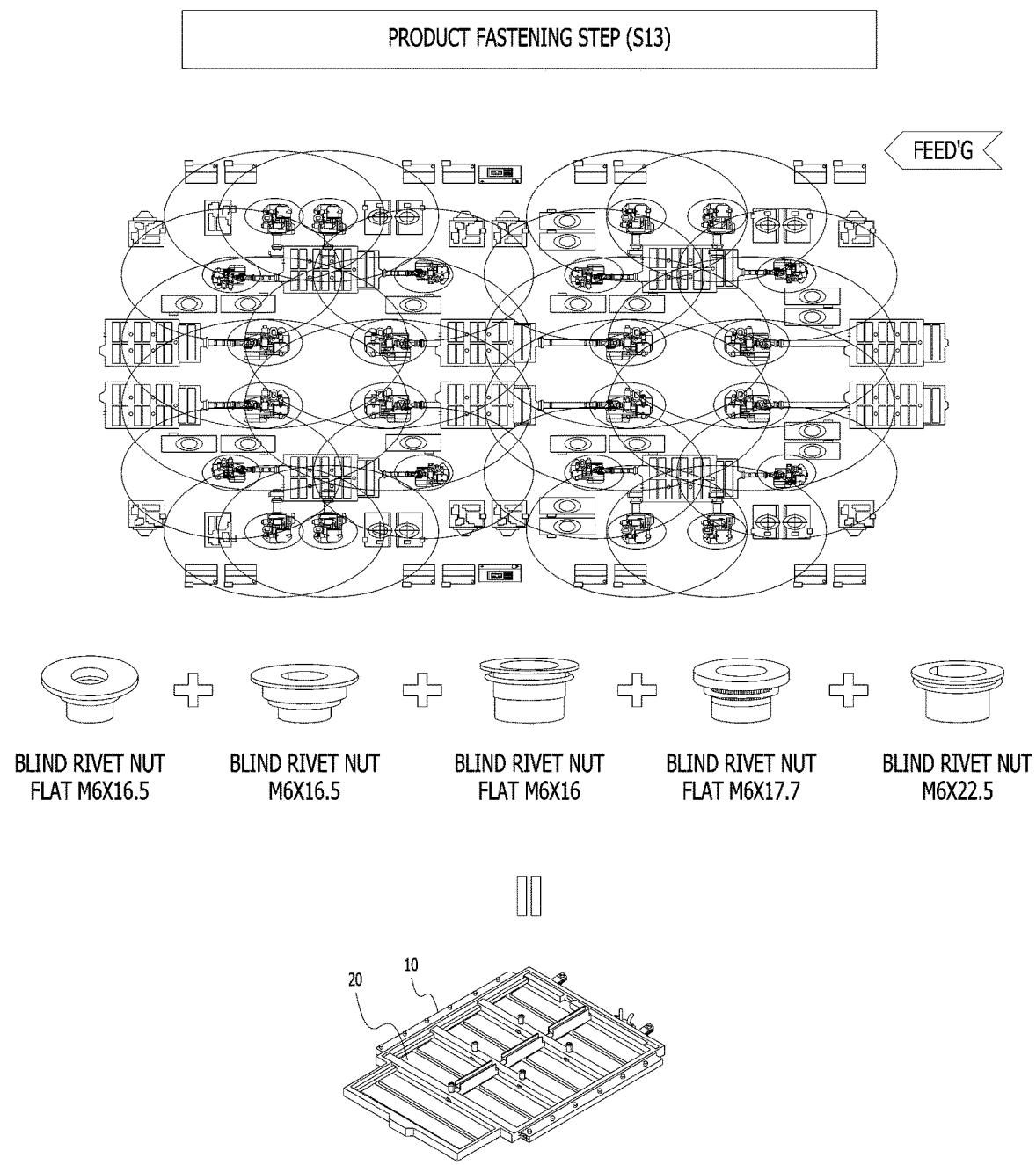
FIG. 18 is a schematic process diagram showing a product fastening step (S13) of the electric vehicle battery case manufacturing method according to one embodiment of the present disclosure.
Figure 19:
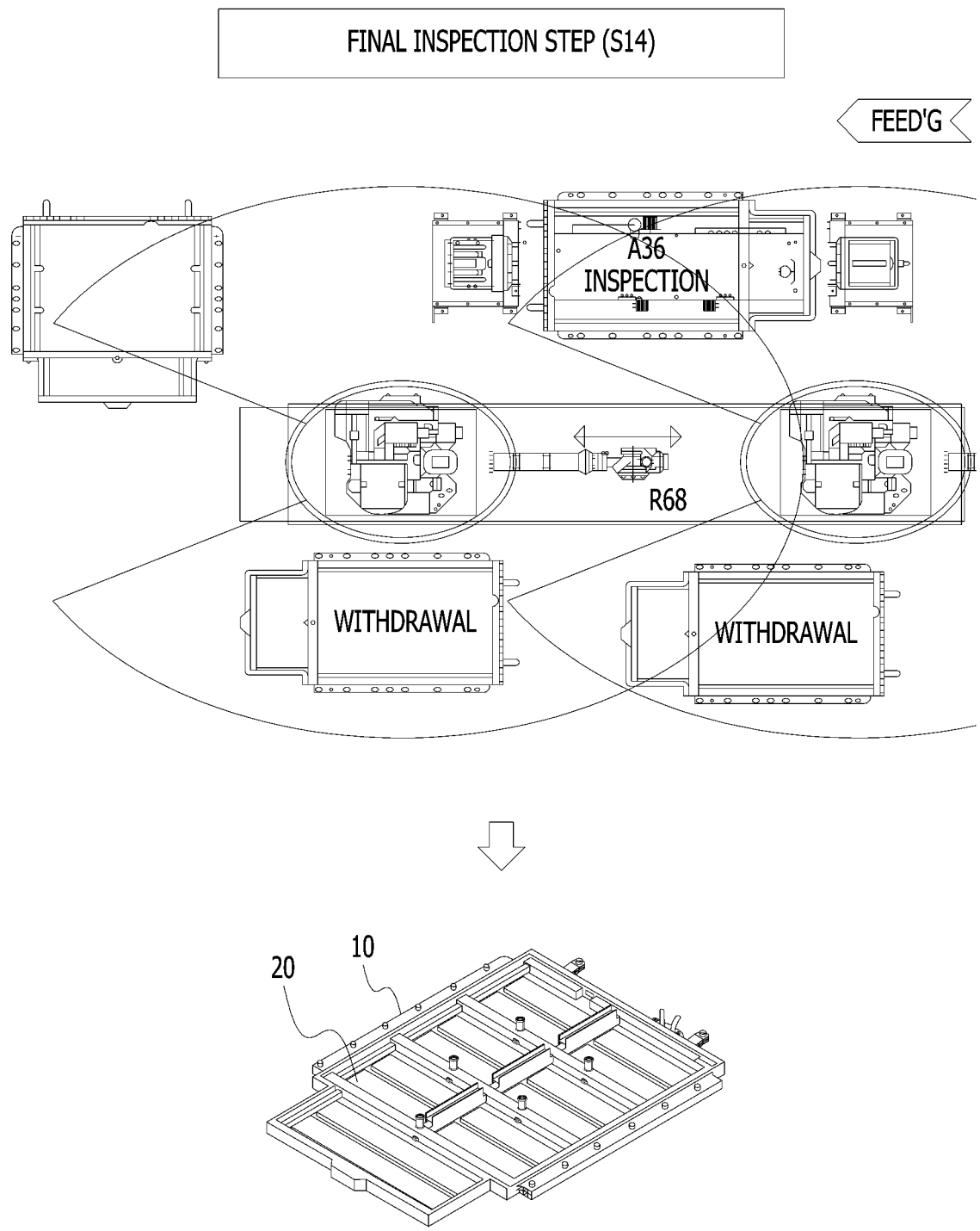
FIG. 19 is a schematic process diagram showing a final inspection step (S14) of the electric vehicle battery case manufacturing method according to one embodiment of the present disclosure.
Figure 20:
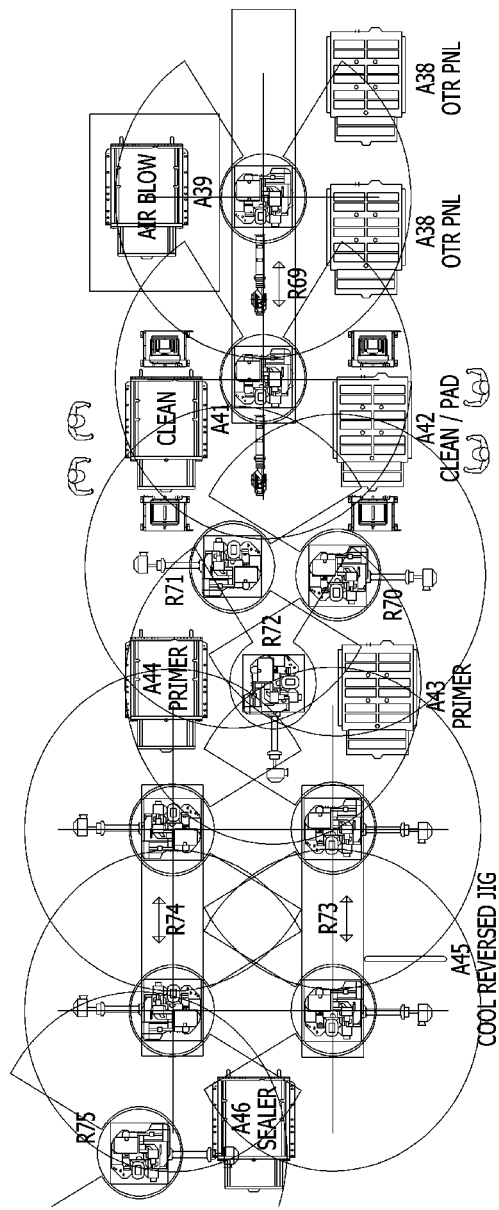
FIG. 20 is a schematic process diagram showing a lower surface cover member preparing step (S15-1) included in a complete product releasing step (S15) of the electric vehicle battery case manufacturing method according to one embodiment of the present disclosure.
Figure 21:
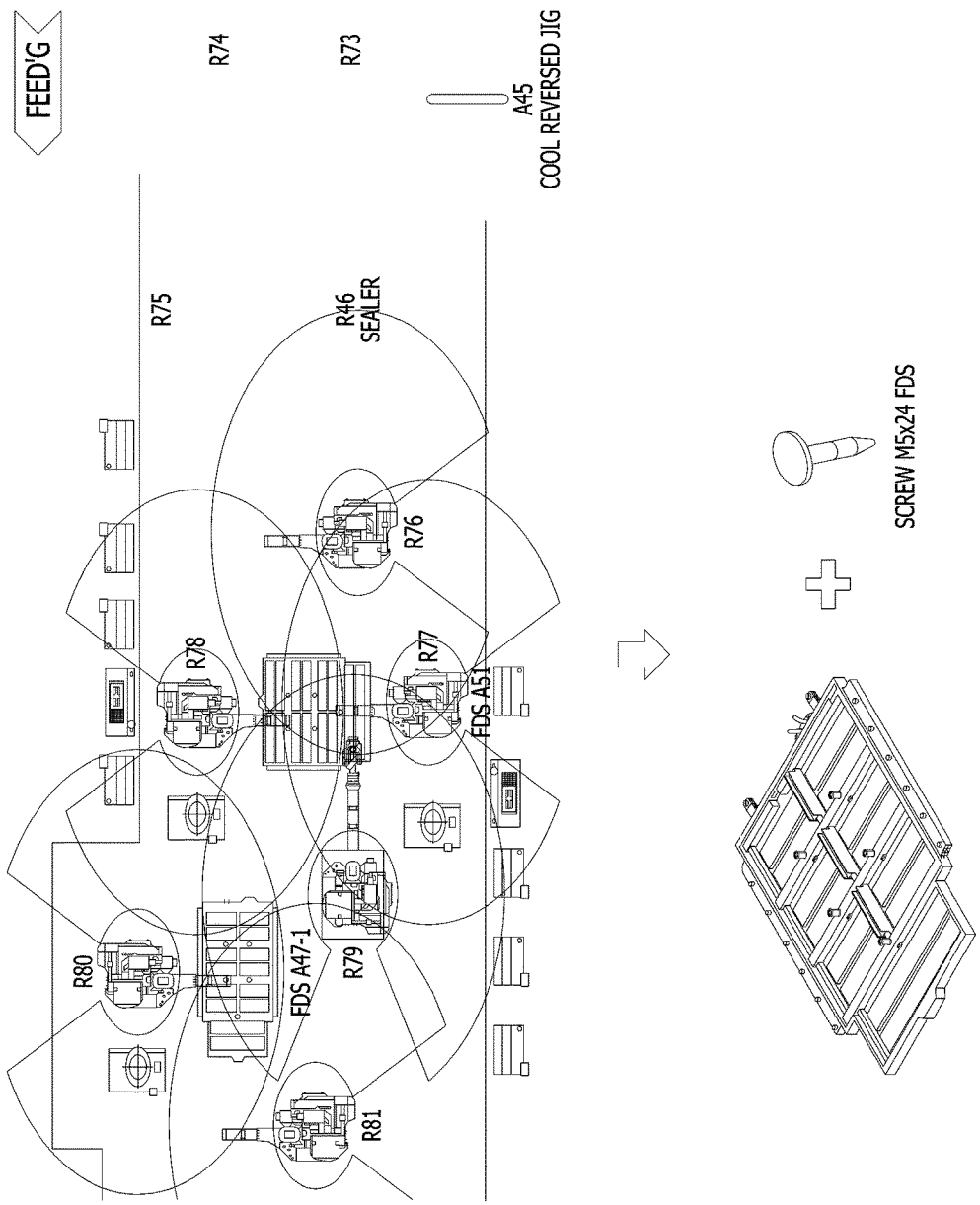
FIG. 21 is a schematic process diagram showing a lower surface cover member fixing step (S16) included in the complete product releasing step (S15) of the electric vehicle battery case manufacturing method according to one embodiment of the present disclosure.
Figure 22:
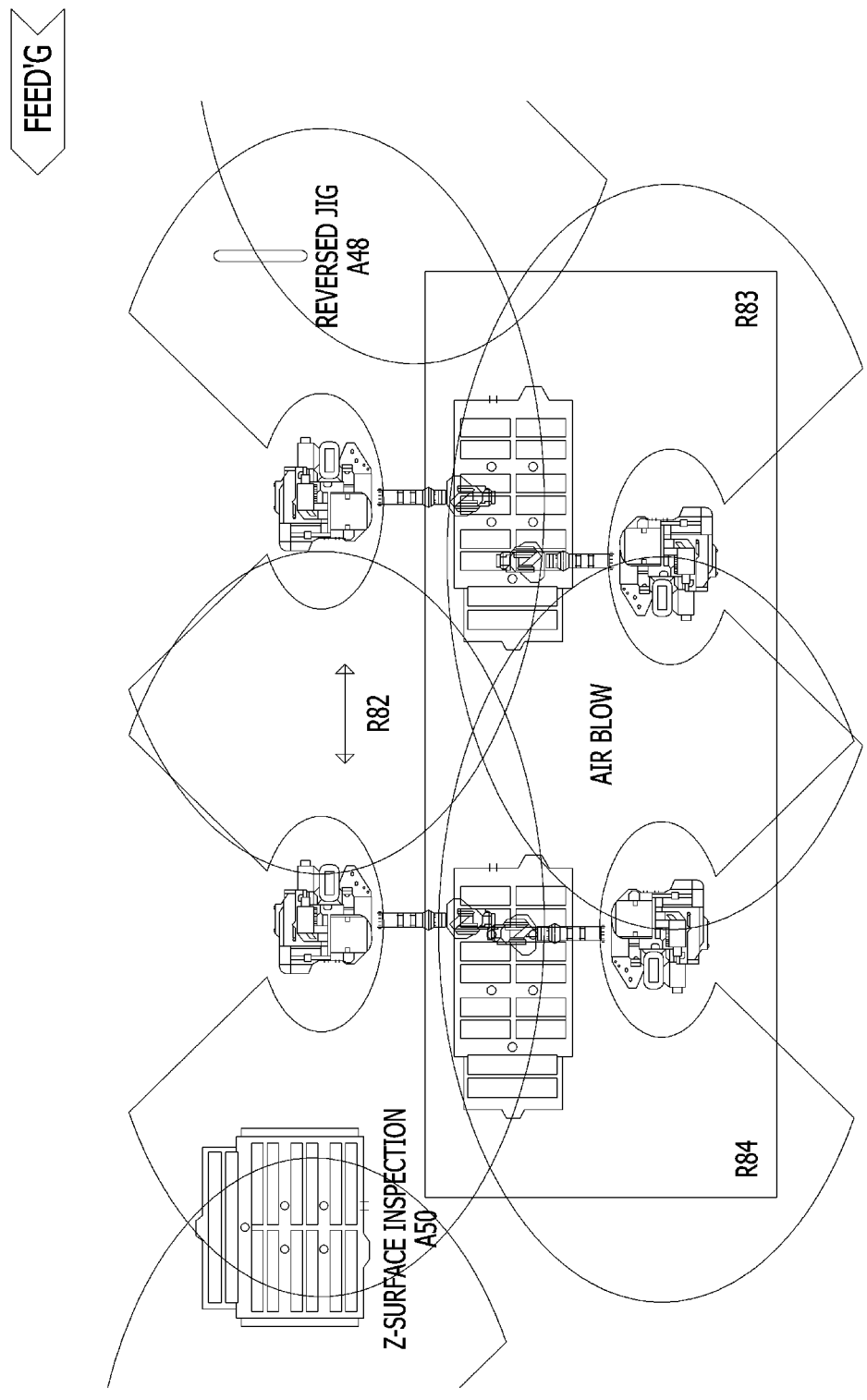
FIG. 22 is a schematic process diagram showing an air blowing and Z-surface inspection step (S17) included in the complete product releasing step (S15) of the electric vehicle battery case manufacturing method according to one embodiment of the present disclosure.
Figure 23:
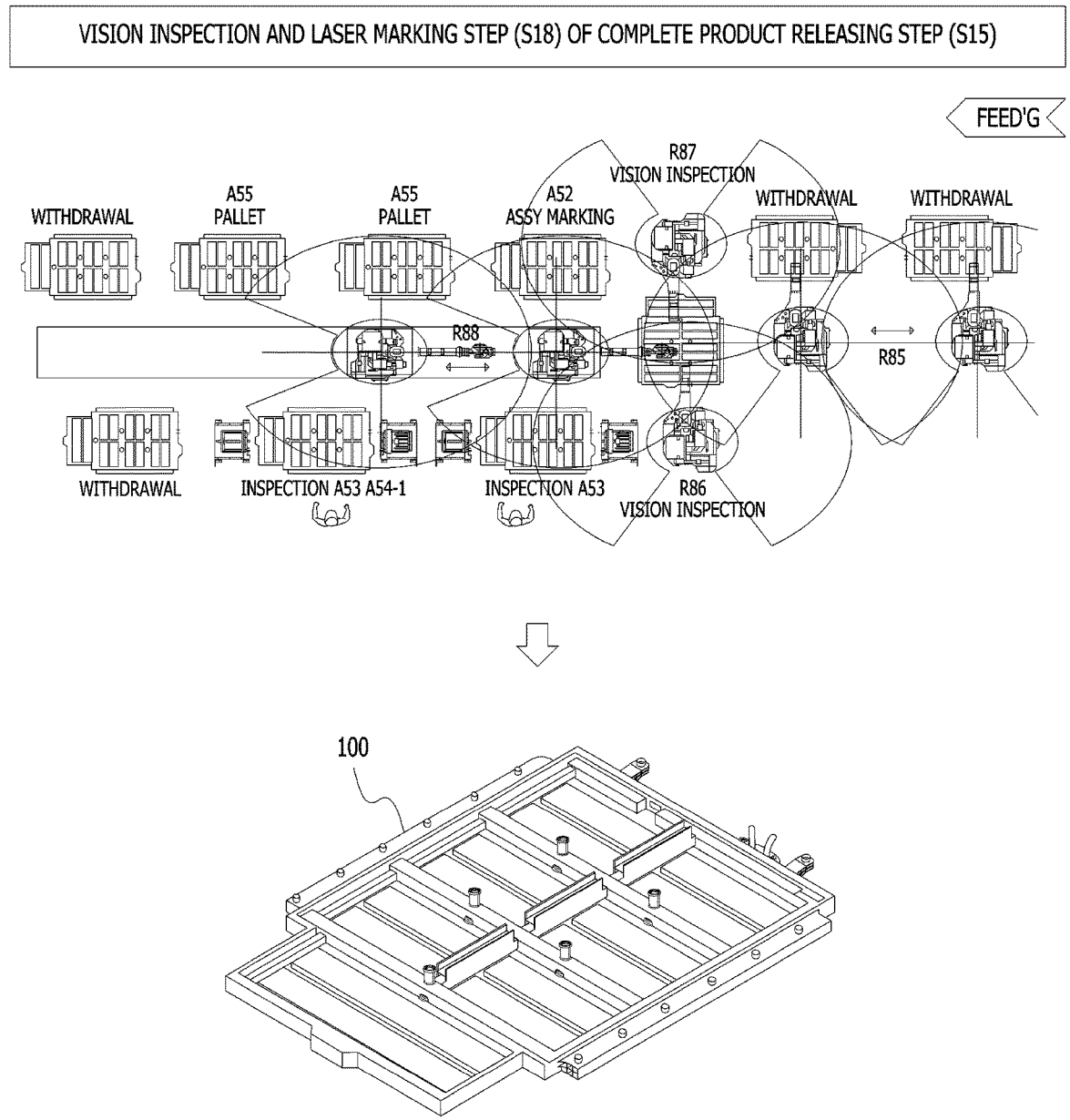
FIG. 23 is a schematic process diagram showing a vision inspection and laser marking step (S18) included in the complete product releasing step (S15) of the electric vehicle battery case manufacturing method according to one embodiment of the present disclosure.

As illustrated in FIGS. 2B, 5, and 8, the first machining step (S3) according to the present embodiment performs an upper welding bead machining step including machining an upper welding bead of the edge frame structure 10 produced through the first welding step (S2). Then, the first machining step (S3) according to the present embodiment performs a lower welding bead machining step including machining a lower welding bead of the edge frame structure 10 after the upper welding bead machining step is performed and performs an air blowing step including performing a cleaning task on a machined surface using compressed air after the lower welding bead machining step is performed.

As illustrated in FIGS. 2B, 3, 5, and 9 to 14, the second welding step (S5) according to the present embodiment may include a bracket welding step (S5-1), a lower sealing plate welding step (S6), a lower sealing plate assembly state inspection step (S7), a FSW step (S8), and a FSW part finishing and inspection step (S9), each of which performs a specific process.

Specifically, the bracket welding step (S5-1) of the second welding step (S5) performs a process of assembling a plurality of bracket module mounting sub-assemblies and a plurality of bracket swelling blocking sub-assemblies to the edge frame structure 10 using the MIG welding method. The lower sealing plate welding step (S6) of the second welding step (S5) performs a process of assembling a lower sealing plate 20 to a lower surface of the edge frame structure 10 produced through the bracket welding step (S5-1) using a laser welding method. The lower sealing plate assembly state inspection step (S7) of the second welding step (S5) performs a process of performing an inspection of an assembly state of the edge frame structure 10 produced through the lower sealing plate welding step (S6). The FSW step (S8) of the second welding step (S5) performs a process of performing final welding of a MIG welding site and a laser welding site on the edge frame structure 10, which has passed through the inspection step (S7), using the FSW method. Also, the FSW part finishing and inspection step (S9) of the second welding step (S5) includes finishing a FSW part and then performing an inspection of a finished surface after the FSW step (S8) is performed.

As illustrated in FIGS. 4, 5, and 20 to 23, the complete product releasing step (S15) according to the present embodiment may include a lower surface cover member preparing step (S15-1), lower surface cover member fixing step (S16), an air blowing and Z-surface inspection step (S17), and a vision inspection and laser marking step (S18), each of which performs a specific process.

Specifically, the lower surface cover member preparing step (S15-1) of the complete product releasing step (S15) performs a process of producing a lower surface cover member 30 having a structure that is able to seal an upper surface of the edge frame structure 10. The lower surface cover member fixing step (S16) of the complete product releasing step (S15) performs a process of mounting the lower surface cover member 30 on the upper surface of the edge frame structure 10 and then fastening the lower surface cover member 30 using a flow drilling screw (FDS). The air blowing and Z-surface inspection step (S17) of the complete product releasing step (S15) performs a process of performing a cleaning task of the product that has passed through the lower surface cover member fixing step (S16) by using compressed air and then performing an inspection of an upper surface and a lower surface of the product. Also, the vision inspection and laser marking step (S18) of the complete product releasing step (S15) performs a process of performing, through a vision inspection, a final inspection of the product that has passed through the air blowing and Z-surface inspection step (S17) and then performing marking using a laser.

As described above, according to the electric vehicle battery case manufacturing method of the present disclosure, since the unit assembly preparing step (S1), the first welding step (S2), the first machining step (S3), the first inspection step (S4), the second welding step (S5), the second machining step (S10), the third welding step (S11), and the second inspection step (S12), each of which performs a specific process, are sequentially performed, surface machining and hole machining are performed after welding in which welding distortion occurs is performed first, and thus welding distortion, dimensional defects in surface machining, and dimensional defects in hole machining according to the related art can be fundamentally prevented, and the man-hour for correcting dimensional defects in surface machining and dimensional defects in hole machining can be eliminated. As a result, not only is it possible to reduce manufacturing costs while securing the efficiency of the production process, but also high quality of the final product can be ensured.

As described above, according to an electric vehicle battery case manufacturing method of the present disclosure, since a unit assembly preparing step, a first welding step, a first machining step, and a first inspection step, each of which performs a specific process, are sequentially performed, surface machining and hole machining are performed after welding in which welding distortion occurs is performed first, and thus welding distortion, dimensional defects in surface machining, and dimensional defects in hole machining according to the related art can be fundamentally prevented, and the man-hour for correcting dimensional defects in surface machining and dimensional defects in hole machining can be eliminated. As a result, not only is it possible to reduce manufacturing costs while securing the efficiency of the production process, but also high quality of the final product can be ensured.

Only some specific embodiments of the present disclosure have been described in the detailed description above. However, it should be understood that the present disclosure is not limited to specific forms mentioned in the detailed description, and all modifications, equivalents, and substitutes within the spirit and scope of the present disclosure defined by the appended claims fall within the present disclosure.

That is, the present disclosure is not limited to the specific embodiments and description given above, and those of ordinary skill in the art to which the present disclosure pertains may make various modifications without departing from the gist of the present disclosure claimed in the claims. Such modifications belong to the protection scope of the present disclosure.

What is claimed is:

1. An electric vehicle battery case manufacturing method comprising:
    a first cycle performing operation of sequentially performing a unit assembly preparing step (S1), a first welding step (S2), a first machining step (S3), and a first inspection step (S4),
        wherein the unit assembly preparing step (S1) performs a process of preparing unit parts, making up sub-assemblies, through aluminum extrusion and initial machining and then welding each sub-assembly, the first welding step (S2) performs a process of assembling the sub-assemblies produced through the unit assembly preparing step (S1) and then performing metal inert gas (MIG) welding, the first machining step (S3) performs a process of performing machining or hole machining on a welding bead part formed by the MIG welding when the MIG welding is performed and a distorted surface of a product assembled through the first welding step (S2), and the first inspection step (S4) performs a process of conducting a leak test on the product having a surface corrected by the first machining step (S3) when the MIG welding is performed, a second cycle performing operation of sequentially performing a second welding step (S5), a second machining step (S10), a third welding step (S11), and a second inspection step (S12) that is performed after the first cycle performing operation, wherein the second welding step (S5) performs a process of performing friction stir welding (FSW) and laser welding on the product that has passed through the first inspection step (S4), the second machining step (S10) performs a process of performing final surface machining on the welding bead part and the distorted surface of the product assembled through the second welding step (S5) and then performing final hole machining at a designed position, the third welding step (S11) performs a process of performing pipe MIG welding on the product produced through the second machining step (S10), and the second inspection step (S12) performs a process of conducting a leak test on the product completed through the third welding step (S11), a complete product providing step (S15) including packaging and providing the product as the electric vehicle battery case.

2. The electric vehicle battery case manufacturing method of claim 1, further comprising:

a product fastening step (S13) including rivet-fastening and screw-fastening the sub-assemblies of the product that has passed through the second inspection step (S12) to assemble the product; and a final inspection step (S14) including performing an inspection of the product completed through the product fastening step (S13) prior to the complete product releasing step (S15).

3. The electric vehicle battery case manufacturing method of claim 2, wherein:

the first machining step (S3) includes an upper welding bead machining step including machining an upper welding bead of the edge frame structure (10) produced through the first welding step (S2), a lower welding bead machining step including machining a lower welding bead of the edge frame structure (10) after the upper welding bead machining step is performed, and an air blowing step including performing a cleaning task on a machined surface using compressed air after the lower welding bead machining step is performed, where in the machining and cleaning are performed only when the MIG welding is performed.

4. The electric vehicle battery case manufacturing method of claim 3, wherein the second welding step (S5) includes:

a lower sealing plate welding step (S6) including assembling a lower sealing plate (20) to a lower surface of the edge frame structure (10) produced through the bracket welding step (S5-1) using a laser welding method;

a lower sealing plate assembly state inspection step (S7) including performing an inspection of an assembly state of the edge frame structure (10) produced through the lower sealing plate welding step (S6);

a FSW step (S8) including performing final welding of a MIG welding site and a laser welding site on the edge frame structure (10), which has passed through the inspection step (S7), using the FSW method; and a FSW part finishing and inspection step (S9) including finishing a FSW part and then performing an inspection of a finished surface after the FSW step (S8) is performed.

5. The electric vehicle battery case manufacturing method of claim 2, wherein the complete product providing step (S15) includes:

a lower surface cover member preparing step (S15-1) including producing a lower surface cover member (30) having a structure configured to sealingly engage with and cover an upper surface of the edge frame structure (10);

a lower surface cover member fixing step (S16) including mounting the lower surface cover member (30) on the upper surface of the edge frame structure (10) and then fastening the lower surface cover member (30) using a flow drilling screw (FDS);

an air blowing and surface inspection step (S17) including performing a cleaning task of the product that has passed through the lower surface cover member fixing step (S16) by using compressed air and then performing an inspection of an upper surface and a lower surface of the product; and a vision inspection and laser marking step (S18) including performing, through a vision inspection, a final inspection of the product that has passed through the air blowing and surface inspection step (S17) and then performing marking using a laser.

* * * * *